United States Patent [19]
Oberlin

[11] 3,959,412
[45] May 25, 1976

[54] BLOCK POLYMER PREPARATION
[75] Inventor: Lyman M. Oberlin, Bartlesville, Okla.
[73] Assignee: Phillips Petroleum Company, Bartlesville, Okla.
[22] Filed: Dec. 10, 1973
[21] Appl. No.: 423,458

[52] U.S. Cl. .......................... 260/880 B; 260/879
[51] Int. Cl.² .......................................... C08L 9/06
[58] Field of Search .......... 260/880 B, 879, 94.2 M, 260/83.7

[56] References Cited
UNITED STATES PATENTS

| | | | |
|---|---|---|---|
| 3,280,084 | 10/1966 | Zelinski et al. | 260/880 B |
| 3,624,057 | 11/1971 | Farrar | 260/94.2 M |
| 3,637,554 | 1/1972 | Childers | 260/880 B |
| 3,644,322 | 2/1972 | Farrar | 260/880 B |
| 3,692,874 | 9/1972 | Farrar | 260/880 B |
| 3,778,490 | 12/1973 | Hsieh | 260/880 B |
| 3,840,616 | 10/1974 | Clark | 260/880 B |

FOREIGN PATENTS OR APPLICATIONS

| | | | |
|---|---|---|---|
| 1,206,800 | 9/1970 | United Kingdom | 260/880 B |

*Primary Examiner*—Paul R. Michl

[57] ABSTRACT

Branched block copolymers are prepared by polymerizing a conjugated diene with or without a monovinyl substituted aromatic compound employing an organoalkalimetal initiator, coupling after substantially complete conversion with a reagent having at least two groups capable of combining with the polymer alkali metal moieties without terminating activity thereof, and thereafter adding a polymerizable monomer other than that employed in the first step.

18 Claims, No Drawings

BLOCK POLYMER PREPARATION

FIELD OF THE INVENTION

The invention relates to methods of preparation of branched block copolymers. In another aspect, the invention pertains to a copolymerization process employing coupling agents.

BACKGROUND OF THE INVENTION

Block copolymers have been prepared by coupling a living polymer with a multifunctional coupling agent reactive with the polymer-alkali metal moieties, and thereafter shortstopping, if necessary, the reaction with a material which inactivates any of the alkali metal-carbon bonds remaining. In present processes, in order to produce multiblock copolymers, a single monomer is polymerized to form a first block A, dissimilar monomer is copolymerized thereonto to produce a block copolymer AB-structure, and the resulting AB-diblock material then can be terminated, or can be coupled with a dipolyfunctional reagent to produce a coupled or branched polymer.

If both monomers are charged simultaneously, and typically in hydrocarbon media with lithium-based initiators, a highly reactive monomer such as butadiene as opposed to styrene tends to polymerize more rapidly. The result is substantially pure polybutadiene tapering with increasing amounts of copolymerized styrene into a substantially polystyrene block, which then can be coupled.

In sequential monomer addition followed by coupling, as well as in mixed monomer polymerization followed by coupling, coupling efficiencies may not be as high as desired due to the extent of conversion that must occur before the coupling agent is employed, since the coupling agent must "find" the active polymer-alkali metal, e.g., polymer-lithium, entities in order to most efficiently perform its coupling purpose.

SUMMARY OF THE INVENTION

According to my invention I polymerize at least one first polymerizable monomer, couple, and without quenching add and copolymerize a second polymerizable monomer differing from the first, and finally quench and recover the polymer.

By this unique process, effective use of the branching agent is obtained since it is used to couple while the polymer in solution is at a lower molecular weight compared with the final product, and while solution viscosities are lower.

DETAILED DESCRIPTION OF THE INVENTION

I have discovered that a most effective method of preparing block copolymers is to polymerize at least one first polymerizable monomer to substantial completion utilizing an organoalkali metal initiator, then to couple or branch the resulting polymer-alkali metal, polymer-Me, entity with a reagent possessing at least two reactive groups reactive with the polymer-Me entity without termination thereof, thereafter to add a second polymerizable monomer different from the first and continue polymerization preferably to substantial completion of conversion.

The process of my invention also can be visualized according to the sequence:

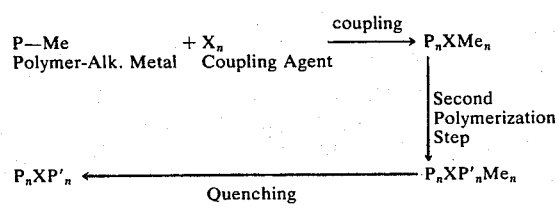

in which representation each P and P' represent polymeric chains each of which can be further represented by —A, —B, —AB, —BA, such that —A represents a homopolymeric block of one or more polymerized conjugated dienes, B a block of one or more polymerized monovinylsubstituted aromatic compounds, and —AB and —BA each represent random or block copolymer blocks of copolymerized conjugated diene with monovinylsubstituted atomatic compound. X represents the residual coupling agent, and n the functionality thereof The polymeric products produced by my process can be represented by such as:

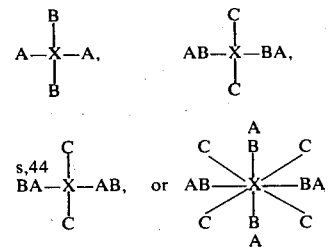

in which A and B represent homopolymeric blocks, AB and BA represent block or random copolymer segments, C = A, —B, —AB, or —BA, differing from the first, and X represents the residual coupling agent. The relative size of branches can be varied as desired.

Of course, the above process representation and formulae are to be considered representations only, to assist in understanding my invention, and are not to be considered as including all possibilities and thus limiting.

MONOMERS

Monomers employable in the process of my invention are those known to polymerize with an alkali metal based initiator system. Such monomers include the polymerizable conjugated dienes, polymerizable monovinyl-substituted aromatic compounds, or mixtures of one or more of each with a randomizing agent. Presently, I prefer using a single polymerizable monomer as the first monomer for most precise control of the final copolymer structure. Of the polymerizable conjugated dienes presently preferred are those of 4 to 12 carbon atoms per molecule as more conveniently available, presently preferred 4 to 8 carbon atoms per molecule for commercial purposes. Of the polymerizable monovinyl-substituted aromatic compounds preferred are those of 8 to 20 carbon atoms per molecule for availability, presently preferred for commercial purposes are those of 8 to 12 carbon atoms per molecule. Examples of suitable monomers include the presently preferred 1,3-butadiene, isoprene, and styrene; as well as 2,3-dimethyl-1,3-butadiene, piperylene, 3-butyl-1,3-octadiene, 2-phenyl-1,3-butadiene, 1-vinylnaphthalene, 3-methylstyrene, 4-methylstyrene, 4-cyclohexylstyrene, and the like.

ORGANO ALKALI METAL INITIATORS

My process employs any of the organomonoalkali metal initiators, preferably organomonolithium, more preferably the hydrocarbylmonolithium initiators known to polymerize the polymerizable monomers as described. Presently preferred is a hydrocarbyllithium initiator represented by RMe wherein R presents a hydrocarbyl radical of up to 20 carbon atoms, and Me represents an alkali metal and is lithium, sodium, potassium, rubidium, or cesium, presently preferably lithium. In practice, although higher molecular weight entities may be utilized, presently conveniently employed are the hydrocarbylmonoalkali metal compounds of up to 12 carbon atoms, such n-butylllithium, sec-butyllithium, tert-butyllithium, cyclopentyllithium, ethyllithium, n-octyllithium, n-dodecyllithium, corresponding sodium, potassium, cesium, and rubidium compounds, and the like.

The amount of initiator employed can vary widely, depending on various polymerization parameters, as known to the art. An exemplary range includes about 0.25 to 100 mhm, gram millimoles per 100 grams of monomers employed.

POLYMERIZATION CONDITIONS

Polymerization conditions such as temperature, pressure, time are those known and employed in the art for polymerizing the polymerizable monomers as described with the initiator described. For example, and illustrative only, are polymerization temperatures varying over a range of such as about −80° C to +150° C for a polymerization time of a few minutes to upwards of 48 hours or more, such as 5 minutes to 24 hours, as may be desired or convenient, for commercial practice, and employing pressures generally sufficient to maintain polymerizaton admixtures substantially in the liquid phase, preferably at or near atmospheric pressure, depending upon temperature and other reaction parameters.

The polymerization conveniently is conducted in the presence of a hydrocarbon diluent substantially nonreactive in the polymerization reaction, such as cyclohexane, benzene, n-hexane, or other hydrocarbons, conveniently of 4 to 12 carbon atoms per molecule, including mixtures thereof. Copolymerizations of a conjugated diene with a monovinyl-substituted aromatic compound can be carried out, if desired, and thus copolymerizations in my first polymerization stage can include a randomizing agent, such as a polar material such as ether, thioether, or a tertiary amine in the polymerization admixture, in an amount sufficient to promote formation of random copolymers in the first stage, all as known in the art.

If desired, the organomonoalkali metal initiator can be employed by adding the initiator to the polymerization reaction mixture by an incremental or continuous basis during at least a portion of the first polymerization reaction step, though this mode tends to broaden molecular weight distribution.

COUPLING AGENTS

Coupling agents suitable for use in the process of this invention are those containing at least two reactive sites, the same or differing, which will react with the polymer-alkali metal moiety represented by Polymer-Me, in which Me is an alkali metal moiety without terminating the activity of Me. These so-reactive coupling or branching agents can be described by the general formula:

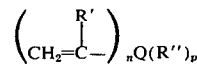

wherein R' is H or an alkyl radical having from 1–4 carbon atoms; R'' is a monovalent hydrocarbyl radical such as alkyl, aryl, alkaryl and the like having from 1–12 carbon atoms; $n$ is an integer of 2, 3 or 4; $p$ is 0 or an integer of 1, 2, 3 or 4; $n+p$ is equal to the valence of Q; and wherein Q is selected from the group consisting of a silicon, tin, or phosphorus atom or a polyvalent hydrocarbyl radical derived from benzene, e.g., the 1,4-phenylene radical.

Examples of suitable reagents include tetravinylsilane, methyltrivinylsilane, dimethyldivinylsilane, tetravinyltin, diphenyldivinyltin, trivinylphosphine, 1,3,5-trivinylbenzene, 1,3,5-triisopropenylbenzene, 1,4-divinylbenzene, 1,4-diisopropenylbenzene and the like. It is often convenient to employ mixtures of suitable coupling agents. For example, a commercially available mixture of isomeric divinylbenzenes can be suitably employed.

After substantial completion of polymerization in the first step, the coupling agent as described is added to the polymerization reaction mixture. The amount of said reagent added preferably is in the range of about one equivalent, i.e., one

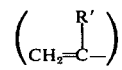

group, per gram equivalent of alkali metal M in the polymer up to about 1.5 equivalents of coupling agent per gram equivalent of alkali metal in the polymer. In order to promote thorough mixing, it may be desirable to add the coupling agent in small increments or continuously over a period of time.

The reaction of the coupling agent with the polymerization reaction mixture is conducted within a broad temperature range, exemplary of which is about −35° to 125° C for a period of a few seconds to 48 hours or more. The pressure employed is not critical but will for convenience be at or near atmospheric pressure. If desired, additional inert hydrocarbon diluent can be added to the reaction mixture prior to, during, or subsequent to the addition of the coupling agent.

SECOND POLYMERIZATION

After the reaction of the coupling agent with the polymerization reaction mixture obtained from the first polymerization, a second polymerizable monomer, or mixture of monomers, plus randomizing agent if desired, is added and polymerized. This can be accomplished without further addition of initiator. The scope of suitable monomers and suitable polymerization conditions for the second polymerization are the same as those described above for the first polymerization. Also, if a polar compound randomizer has not been utilized in the first polymerization step, such can be added to the reaction mixture to promote random copolymerization of a mixture of suitable monomers in the second polymerization. Where a polar organic compound randomizing agent has been employed in the first polymerization, its continued presence promotes random copolymerization in the second polymerization, where two monomers are employed as the second polymerizable monomer. Additional randomizing agent can be added if desired.

At the conclusion of the second polymerization, preferably, when essentially all of the monomers present have been polymerized, e.g., substantial completion of conversion has been reached, the reaction mixture is quenched by the addition of an active hydrogen compound, e.g., a compound which replaces the alkali metal in polymer-alkali metal, such as and preferably lithium in polymer-lithium, with a hydrogen. Such reagents are known in the art and include alcohols, water, carboxylic acids and the like. Polymer stabilizers conveniently are added at this point and the polymer product recovered by conventional means such as alcohol coagulation or steam stripping in the presence of parting aids or dispersants.

EXAMPLE

Exemplary data provided are intended to assist in illustrating the invention, with the intent to assist the practitioner of the polymerization arts in understanding the invention disclosed and claimed. Particular species employed, amounts, relationships, are intended to be illustrative, and not limitative of the reasonable scope of my invention.

EXAMPLE I

A series of runs was made employing 1,3-butadiene in the first polimerization, tetravinylsilane as coupling agent, followed by polymerization of styrene as the second monomer polymerization step. The following polymerization recipe was employed:

| Polymerization Recipe (Runs 1–3) | Parts, by wt. or (mhm) |
|---|---|
| Step 1 | |
| 1,3-Butadiene | 60 |
| Cyclohexane | 760 |
| n-Butyllithium, mhm | (3.2) |
| Temperature, °F | 158 |
| Time, hours | 1 |
| Step 2 | |
| Tetravinylsilane (TVS), mhm | (0.7) |
| Temperature, °F | 158 |
| Time, hours | 0.5 |
| Step 3 | |
| Styrene | 40 |
| Temperature, °F | 158 |
| Time, hours | 0.5 |

In this series of runs cyclohexane was charged to the reactor first followed by a nitrogen purge. Butadiene was added next followed by n-butyllithium and the mixture polymerized as indicated. Run 1 was terminated after step 1. Run 2 was terminated after step 2. Run 3 was terminated after step 3. Runs 1 and 2 were terminated by the addition of 2 ml of a solution (0.1 g/ml) of an antioxidant, 2,6di-tert-butyl-4-methyl-phenol, in a 50/50 by volume mixture of isopropyl alcohol/cyclohexane. Run 3 was terminated by the use of 4 ml of this same solution. The terminated reaction mixtures were coagulated and the polymers separated and dried under vacuum.

From the above description it is seen that the polymers of Runs 1 and 2 are the "parent polymers" to that of Run 3 which is a Run according to the instant invention.

Two other runs were conducted which represented prior art procedures for making branched block copolymers. Run 4 represents the use of $SiCl_4$ in making radial teleblock copolymers of butadiene/styrene while Run 5 is in accordance with the broad teaching of British Patent No. 1.006,816, page 2. The polymerization recipes and procedures for these runs are shown below.

| Polymerization Recipe (Run 4) | Parts, by wt. or (mhm) |
|---|---|
| Step 1 | |
| Styrene | 40 |
| Cyclohexane | 760 |
| n-Butyllithium, mhm | (3.2) |
| Temperature, °F | 158 |
| Time, hours | 0.5 |
| Step 2 | |
| 1,3-Butadiene | 60 |
| Temperature, °F | 158 |
| Time, hours | 0.67 |
| Step 3 | |
| $SiCl_4$, mhm | (0.7) |
| Temperature, °F | 158 |
| Time, hours | 0.17 |

A portion of the reaction mixture of Run 4 was withdrawn after Step 2, terminated and the polymer recovered therefrom. The remainder of the reaction mixture was terminated after Step 3 and the polymer recovered in the same manner as previously described.

| Polymerization Recipe (Run 5) | Parts, by wt. or (mhm) |
|---|---|
| Step 1 | |
| 1,3-Butadiene | 60 |
| Styrene | 40 |
| Cyclohexane | 760 |
| n-Butyllithium, mhm | (3.2) |
| Temperature, °F | 158 |
| Time, hours (69% Conv.) | 0.44 |
| Step 2 | |
| Tetravinylsilane (TVS), mhm | (0.7) |
| Temperature, °F | 158 |
| Time, hours | 0.33 |

A portion of the reaction mixture for Run 5 was withdrawn after Step 1, terminated and the polymer recovered therefrom. The remainder of the reaction mixture was terminated after Step 2 and the polymer recovered in the same manner as previously described.

The sampling of Runs 4 and 5 as indicated provided polymer samples which may be regarded as the respective "parent polymer" for the polymers recovered after the final step in each process.

It should be noted that the amount of $SiCl_4$ and TVS employed (0.7 mhm) represents the estimated stoichiometric amount based on an estimated effective n-butyllithium level of 2.8 mhm, i.e., 0.4 mhm n-butyllithium was estimated to be destroyed by impurities in the polymerization system. In Runs 4 and 5 allowance was also made for the samples withdrawn from the polymerization mixtures in the charging of the proper amounts of SiCl$_4$ and TVS respectively.

The results from the above described runs are presented in Table I below.

Table I

| Run No. | Conv., % | Inherent Viscosity | Gel, % | Mooney[a] Viscosity | Mw/Mn[c] × 10$^3$ | GPC[b] Heterogeneity[d] Index |
|---|---|---|---|---|---|---|
| 1 | 100 | 0.47 | 0 | — | 26/20 | 1.31 |
| 2 | 100 | 0.72 | 0 | — | 83/44 | 1.88 |
| 3 | 100 | 0.73 | 0 | — | 96/61 | 1.58 |
| 4* | 100 | 0.57 | 0 | — | 62/44 | 1.40 |
| 4 | 100 | 0.99 | 0 | [e] | 161/113 | 1.42 |
| 5* | 69 | 0.48 | 0 | — | 36/28 | 1.26 |
| 5 | 100 | 0.73 | 0 | 14 | 118/75 | 1.57 |

*Parent polymers from sampling of reaction mixtures prior to addition of SiCl$_4$ and TVS respectively.
[a]ML-4 at 212° F, — indicates value not measured.
[b]Gel permeation chromatography analyses.
[c]Mw = weight average molecular weight. Mn = number average molecular weight.
[d]Ratio of Mw/Mn as determined by calibrated GPC instrument.
[e]Too high to measure.

The results of Runs 1 to 3 in Table I demonstrate that the process of the instant invention is operable for producing branched block copolymers of butadiene and styrene.

Subsequently, the polymeric products of Run 3 and Run 5 were examined for block polystyrene content by oxidative degradation according to the procedure of 1 J. Polymer Sci. 429 (1946), with the following results:

| Polymer Run No. | Block Polystyrene, Weight Per Cent |
|---|---|
| 3 invention | 39.6 |
| 5 control | 31.4 |

The method of the invention results in a block copolymer with a higher percentage of the second monomer, the monovinyl aromatic compound, in homopolymeric block form, than was possible according to previously known methods exemplified by control run 5 above, which run is a method of the prior art in which a coupling agent is added during polymerization. Since conversion in each run was 100 per cent, it can be readily deduced that the amount of styrene originally charged but which was not found by oxidative degradation analysis of Control Run 5 must have been present in the polybutadiene segments in blocks and/or segments too small to be detected by the oxidative degradation analysis.

The branched block copolymers prepared according to the process of this invention can be employed in adhesive compositions, in shoe soles, in cove base, and the like. Certain of the polymers can be prepared such that they will exhibit high tensile strength in an uncured condition. The products of this invention can be compounded and cured with conventional curing systems. Fillers such as carbon black, clays, silicas and the like can be employed. Softeners, tackifiers, antioxidants, pigments and the like can be employed in a conventional manner with the polymers produced according to this invention.

Other modifications and alterations of this invention will become apparent to those skilled in the art from the foregoing discussion and it should be understood that this invention is not to be unduly limited thereto.

I claim:

1. A process of block copolymerization comprising (a) polymerizing under polymerization condition employing a hydrocarbylmonoalkali metal-based initiator at least one first polymerizable monomer until substantial completion of conversion, thereby preparing a block polymer containing a polymer-alkali metal moiety on the end thereof, (b) coupling the resulting block polymer from said step (a) with a coupling agent containing at least two reactive groups capable of reacting with said polymer-alkali metal moiety of said block polymer without terminating the activity thereof, (c) adding to the reaction mixture resulting from said coupling step (b) without termination thereof at least one second polymerizable monomer differing from said first polymerizable monomer and continuing said polymerization under polymerization conditions, until substantial completion of conversion, wherein each said polymerizable monomer is a polymerizable conjugated diene or a polymerizable monovinyl-substituted aromatic compound, wherein said hydrocarbylmonoalkali metal-based initiator is employed in a range of about 0.25 to 100 mhm, gram millimoles per 100 grams of total monomers employed, and said alkali metal is selected from the group consisting of lithium, sodium, potassium, rubidium, and cesium, and wherein said coupling agent is

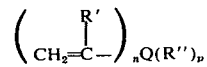

wherein R' is hydrogen or an alkyl radical of up to 4 carbon atoms, R'' is a monovalent hydrocarbyl radical of up to 12 carbon atoms, n is an integer of 2–4 inclusive, p is 0 or an integer of 1–4 inclusive, such that $n + p$ = the valence of Q, wherein Q is silicon, ton, or phosphorus.

2. The process according to claim 1 wherein said conjugated diene contains 4 to 12 carbon atoms per molecule, and said polymerizable monovinyl-substituted aromatic compound contains 8 to 20 carbon atoms per molecule.

3. The process according to claim 1 wherein said second polymerization step (c) is conducted without addition of further initiator.

4. The process according to claim 1 wherein further initiator is employed in said second polymerization step (c).

5. The process of claim 1 wherein said step (c) polymerization is conducted to substantial completion of conversion, and further including step (d) of thereafter terminating said polymerization.

6. The process according to claim 1 wherein in said hydrocarbylmonoalkali metal initiator said hydrocarbyl radical contains up to 20 carbon atoms.

7. The process according to claim 3 wherein said alkali metal is lithium.

8. The process according to claim 7 wherein each said polymerization is conducted at a temperature within the range of about −80° C to +150° C, and said polymerizations include the presence of a hydrocarbon diluent.

9. The process according to claim 1 wherein at least one of said polymerization steps includes the presence of a polar compound as randomizing agent.

10. The process according to claim 9 wherein said at least one first polymerizable monomer includes at least one conjugated diene and at least one monovinyl-substituted aromatic compound copolymerized in the presence of a polar compound randomizing agent.

11. The process according to claim 9 wherein said second polymerizable monomer includes at least one polymerizable conjugated diene and at least one monovinyl-substituted aromatic compound, copolymerized in the presence of a polar compound randomizing agent.

12. The process according to claim 1 wherein said coupling agent is tetravinylsilane, methyltrivinylsilane, dimethyldivinylsilane, tetravinyl tin, diphenyldivinyl tin, or trivinylphosphine.

13. The process according to claim 12 wherein said coupling agent is employed in an amount sufficient to provide up to 1.5 equivalents of coupling agent per gram equivalent of polymer-alkali metal.

14. The process according to claim 13 wherein said coupling agent is employed in the range of about 1 to 1.5 equivalents per equivalent of polymer-alkali metal.

15. The process according to claim 14 wherein said first polymerizable monomer is 1,3-butadiene, said second polymerizable monomer is styrene, said coupling agent is tetravinylsilane.

16. The process according to claim 15 wherein said first polymerizable monomer is styrene, said second polymerizable monomer is 1,3-butadiene, said coupling agent is tetravinylsilane.

17. The process according to claim 1 wherein said Q is silicon.

18. The polymeric product prepared according to the process of claim 1.

* * * * *

UNITED STATES PATENT AND TRADEMARK OFFICE
CERTIFICATE OF CORRECTION

PATENT NO. : 3,959,412

DATED : May 25, 1976

INVENTOR(S) : Lyman M. Oberlin

It is certified that error appears in the above—identified patent and that said Letters Patent are hereby corrected as shown below:

Column 8, line 55, delete "ton," and insert -- tin, --.

Signed and Sealed this

Thirty-first Day of August 1976

[SEAL]

Attest:

RUTH C. MASON
*Attesting Officer*

C. MARSHALL DANN
*Commissioner of Patents and Trademarks*